US009515996B1

(12) United States Patent
Juels et al.

(10) Patent No.: US 9,515,996 B1
(45) Date of Patent: Dec. 6, 2016

(54) DISTRIBUTED PASSWORD-BASED AUTHENTICATION IN A PUBLIC KEY CRYPTOGRAPHY AUTHENTICATION SYSTEM

(71) Applicant: EMC Corporation, Hopkinton, MA (US)

(72) Inventors: Ari Juels, Brookline, MA (US); Gareth Richards, Oxfordshire (GB)

(73) Assignee: EMC IP Holding Company LLC, Hopkinton, MA (US)

( * ) Notice: Subject to any disclaimer, the term of this patent is extended or adjusted under 35 U.S.C. 154(b) by 211 days.

(21) Appl. No.: 13/930,884

(22) Filed: Jun. 28, 2013

(51) Int. Cl.
*H04L 9/32* (2006.01)
*H04L 29/06* (2006.01)

(52) U.S. Cl.
CPC .................. *H04L 63/0428* (2013.01)

(58) Field of Classification Search
CPC .... H04L 29/06; H04L 9/3273; H04L 63/0869; H04L 9/3281; H04N 21/8358; H04N 1/32144
USPC . 713/176, 168–174, 182–186, 202; 709/206, 709/225, 229, 249, 389; 726/2–8
See application file for complete search history.

(56) References Cited

U.S. PATENT DOCUMENTS

| 2003/0229788 | A1* | 12/2003 | Jakobsson | H04L 9/0844 713/171 |
| 2005/0027985 | A1* | 2/2005 | Sprunk et al. | 713/171 |
| 2007/0127723 | A1 | 6/2007 | Grobman | |
| 2008/0134311 | A1* | 6/2008 | Medvinsky | G06F 21/33 726/7 |
| 2008/0175393 | A1* | 7/2008 | Oba et al. | 380/279 |
| 2009/0204808 | A1* | 8/2009 | Guo et al. | 713/155 |
| 2009/0217029 | A1 | 8/2009 | Ilac et al. | |
| 2010/0242102 | A1* | 9/2010 | Cross | G06F 21/32 726/7 |

OTHER PUBLICATIONS

S.T. Faraj Al-Janabi et al., "Public-Key Cryptography Enabled Kerberos Authentication," IEEE Computer Society, Developments in E-Systems Engineering (DESE), Dec. 2011, pp. 209-214.
M.A. Sirbu et al., "Distributed Authentication in Kerberos Using Public Key Cryptography," Symposium on Network and Distributed System Security (NDSS), Feb. 1997, pp. 134-141.

(Continued)

*Primary Examiner* — Evans Desrosiers
(74) *Attorney, Agent, or Firm* — Ryan, Mason & Lewis, LLP

(57) ABSTRACT

An authentication system comprises a plurality of servers storing respective shares of a private key, and a controller associated with the servers. The authentication system is configured to receive a message comprising a password encrypted using a public key corresponding to the private key. The controller directs performance of distributed password-based authentication in the authentication system based at least in part on the encrypted password utilizing the shares of the private key stored in the respective servers. The message is formatted in a manner consistent with an authentication protocol that normally utilizes public key signatures as a mechanism for authentication but is modified to support password-based authentication. For example, the message may be formatted in a manner consistent with a request message of a Kerberos PKINIT protocol extension.

21 Claims, 3 Drawing Sheets

(56) References Cited

OTHER PUBLICATIONS

S.K. Pathan et al., "Kerberos Authentication System—A Public Key Extension," Poster Paper—International Journal of Recent Trends in Engineering, May 2009, pp. 15-18, vol. 1, No. 2.

M.A. Sirbu et al., "Distributed Authentication in Kerberos Using Public Key Cryptography," Symposium on Network and Distributed System Security (NDSS), Feb. 1997, 18 pages.

S.S. Thorat et al., "Comparative Study of Various PKINIT Methods Used in Advanced Kerberos," International Journal on Computer Science and Engineering (IJCSE), Nov. 2010, pp. 2337-2344, vol. 2, No. 7.

"Kerberos Consortium," http://www.kerberos.org/, 2012, 3 pages.

J. Brainard et al., "A New Two-Server Approach for Authentication with Short Secrets," 12th USENIX Security Symposium(SSYM), Aug. 2003, pp. 201-214, vol. 12.

J. Camenisch et al., "Practical Yet Universally Composable Two-Server Password-Authenticated Secret Sharing," ACM Conference on Computer and Communications Security (CCS), Oct. 2012, pp. 525-536.

I. Cervesato et al., "Breaking and Fixing Public-Key Kerberos," Information and Computation, Feb. 2008, pp. 402-424, vol. 206, No. 2-4.

C. Neuman et al., "Ther Kerberos Network Authentication Service (V5)," Network Working Group, Request for Comments: 4120, Jul. 2005, 138 pages.

"New RSA Innovation Helps Thwart "Smash-and-Grab" Credential Theft," Press Release, http://www.emc.com/about/news/press/2012/20121009-01.htm, 2012, 3 pages.

M. Szydlo et al., "Proofs for Two-Server Password Authentication," CT-RSA, LNCS 3376, 2005, pp. 227-244.

U.S. Appl. No. 13/795,801 filed in the name of Ari Juels on Mar. 12, 2013 and entitled "Distributed Cryptography Using Distinct Value Sets Each Comprising at Least One Obscured Secret Value."

* cited by examiner

DISTRIBUTED PASSWORD-BASED AUTHENTICATION IN A PUBLIC KEY CRYPTOGRAPHY AUTHENTICATION SYSTEM

FIELD

The field relates generally to authentication systems, and more particularly to authentication techniques that involve use of public key cryptography.

BACKGROUND

Kerberos is a popular and widely deployed authentication protocol. It involves an entity known as a key distribution center (KDC), which manages client authentication and credential issuance. A client generally authenticates to the KDC in order to obtain credentials for access to networked computing resources. As a central, trusted entity, the KDC conveniently provides a single sign-on service to clients.

In its most common use, Kerberos permits client authentication by means of a user-supplied password. The KDC stores digests of these passwords for verification. Consequently, an adversary that breaches the KDC can compromise or at least substantially weaken the credentials of all users. More particularly, breach of the KDC reveals user passwords, albeit it in hashed form.

Password-based Kerberos protocol variants generally do not adequately support distributed password verification. For example, a given such variant may require the KDC to verify a ciphertext encrypted under a password-derived key, and therefore requires explicit access to the password or the derived key.

Accordingly, a need exists for techniques to support distributed password-based authentication in Kerberos and other protocols.

SUMMARY

Illustrative embodiments of the present invention allow distributed password-based authentication to be implemented in a public key cryptography authentication system. For example, in some of these embodiments, the PKINIT protocol extension to Kerberos authentication is modified to permit distributed password-based authentication in that context and in a manner that provides improved security relative to the unmodified Kerberos PKINIT protocol extension.

In one embodiment, an authentication system comprises a plurality of servers storing respective shares of a private key, and a controller associated with the servers. The authentication system is configured to receive a message comprising a password encrypted using a public key corresponding to the private key. The controller directs performance of distributed password-based authentication in the authentication system based at least in part on the encrypted password utilizing the shares of the private key stored in the respective servers. The message is formatted in a manner consistent with an authentication protocol that normally utilizes public key signatures as a mechanism for authentication but is modified to support password-based authentication.

By way of example, the message may be formatted in a manner consistent with a request message of a Kerberos PKINIT protocol extension. More particularly, the message may comprise an (a, b, c)-formatted request message of the Kerberos PKINIT protocol extension that has been modified to incorporate the encrypted password. The modified request message may be configured to bind the encrypted password to other message elements through inclusion in a common ciphertext.

Such an arrangement advantageously modifies the Kerberos PKINIT protocol extension so that it can support password-based authentication, thereby providing support for distributed password-based authentication in Kerberos.

Embodiments of the invention can be implemented in a wide variety of different authentication applications.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

Embodiments of the invention may make use of techniques disclosed in U.S. patent application Ser. No. 13/795,801, filed Mar. 12, 2013 and entitled "Distributed Cryptography Using Distinct Value Sets Each Comprising at least one Obscured Secret Value," which is commonly assigned herewith and incorporated by reference herein. These techniques include storing in multiple servers distinct chaff sets or other types of value sets each of which includes one or more obscured secret values.

Figure 1:
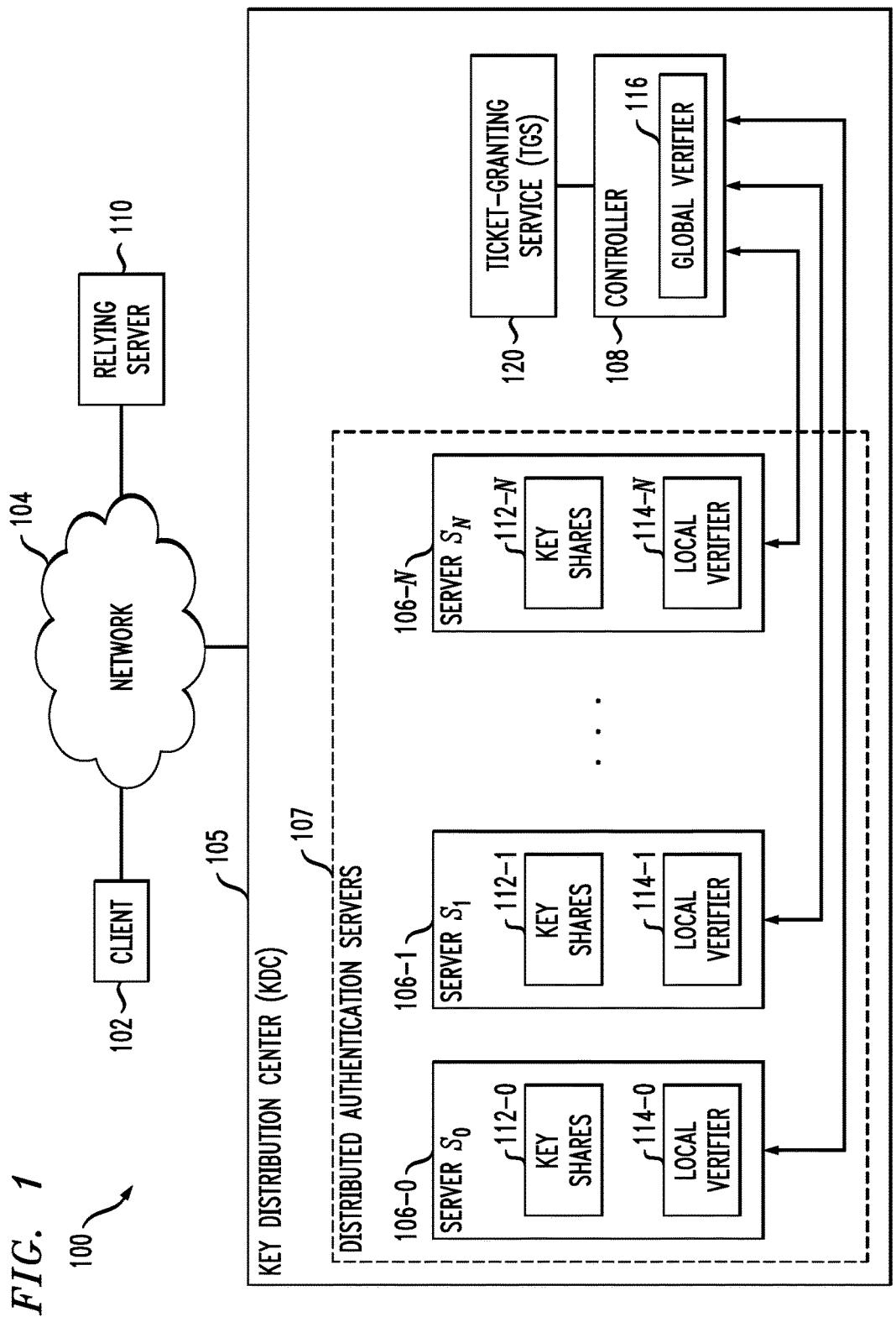
FIG. 1 is a block diagram of a communication system incorporating distributed password-based authentication using a modified Kerberos protocol extension in an illustrative embodiment of the invention.

FIG. 1 shows a communication system 100 that incorporates functionality for distributed password-based authentication using a modified Kerberos protocol extension in an illustrative embodiment. The system 100 comprises a client 102 that communicates over a network 104 with a key distribution center (KDC) 105. The KDC 105 comprises a plurality of servers 106-0, 106-1, . . . 106-N coupled to a controller 108. It is assumed in the present embodiment that the client 102 is able to communicate over the network 104 with each of the servers 106 and the controller 108, although other arrangements can be used in other embodiments. For example, in some embodiments, communication between the client 102 and one or more of the servers 106 may flow through the controller 108.

The client 102 may comprise, for example, a mobile telephone, a laptop computer, a tablet computer or other user device. The client may be associated with a particular user having a password, where "user" as the term is applied herein should be generally construed so as to encompass a human user or an associated hardware or software entity, or possibly a combination of such elements. For example, a user as that term is utilized herein may comprise a client, or a human user persistently or temporarily associated with that client. Numerous alternative arrangements are possible.

The network 104 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

Also coupled to the network 104 in the present embodiment is a relying server 110 that relies on an authentication result produced at least in part by the KDC 105. In other embodiments, the relying server may instead be one or more of the servers 106, or another element of the KDC 105.

It may be assumed in conjunction with some embodiments that there are authenticated communication channels between the system entities such as client 102, servers 106, controller 108 and server 110. Secure channels may be established using techniques such as secure sockets layer (SSL) or transport layer security (TLS). Such techniques are well known in the art and therefore not described in detail herein.

The servers 106-0, 106-1, . . . 106-N are also denoted in the figure as servers $S_0$, $S_1$, . . . $S_N$, respectively. The controller 108 is configured to provide to the servers 106 respective ones of a plurality of shares of a private key. More particularly, in the present embodiment, shares 112-0, 112-1, . . . 112-N of the private key are illustratively stored on respective servers $S_0$, $S_1$, . . . $S_N$ under the control of the controller 108. The private key is assumed to have a corresponding public key that is accessible to the client 102. The key shares 112 are assumed to be stored in respective memories of the servers 106.

The term "share" as used herein is intended to be broadly construed, and a given share in some embodiments may comprise at least a portion of the key suitably obscured with other information, such as a chaff set. For example, the shares may be generated and distributed at least in part utilizing chaff sets of the type disclosed in the above-cited U.S. patent application Ser. No. 13/795,801. Numerous other techniques may be used to distribute key shares over the servers 106.

The servers 106 and the controller 108 operate on one or more messages received by the KDC 105 in conjunction with a distributed password-based authentication protocol. The received message illustratively comprises a password encrypted using the public key corresponding to the private key. The password is assumed to be the password of a user comprising or otherwise associated with client 102.

The servers 106-0, 106-1, . . . 106-N comprise respective local verifiers 114-0, 114-1, . . . 114-N each configured to generate an indication based on its corresponding stored key share 112 and at least a portion of the received message comprising the encrypted password. For example, the indication generated by a particular server may indicate acceptance or rejection of the received message or a portion thereof by that server based on its corresponding share of the private key. As will be described in more detail below, such an indication is utilized in conjunction with corresponding indications generated by respective ones of the other servers 106 to implement distributed password-based authentication based at least in part on the encrypted password.

The controller 108 comprises a global verifier 116 configured to authenticate the received message based on the indications generated by at least a subset of the servers 106. The controller 108 may also comprise other modules not explicitly shown, such as a key share generation module that is configured to generate at least a portion of the key shares 112 for storage on the respective servers 106.

In this embodiment, the controller 108 directs performance of distributed password-based authentication in the KDC 105. The controller 108 is coupled to an otherwise conventional ticket-granting service (TGS) module 120 of the KDC 105.

The received message is formatted in a manner consistent with an authentication protocol that normally utilizes public key signatures as a mechanism for authentication but is modified to support password-based authentication. For example, the message may be formatted in a manner consistent with a request message of a Kerberos PKINIT protocol extension. More particularly, the message may comprise an (a, b, c)-formatted request message of the Kerberos PKINIT protocol extension that has been modified to incorporate the encrypted password. The modified request message may be configured to bind the encrypted password to other message elements through inclusion in a common ciphertext.

Such an arrangement modifies the Kerberos PKINIT protocol extension so that it can support password-based authentication. This advantageously provides support for distributed password-based authentication in Kerberos.

In some embodiments, the modified Kerberos PKINIT protocol extension is referred to herein as PKINIT* and exploits the presence of public key authentication functionality in PKINIT to permit clients to authenticate to the KDC 105 using distributed password-based authentication. The unmodified PKINIT is not designed for password-based authentication, but instead permits clients to authenticate to the KDC using public key authentication. An authentication system based on use of unmodified PKINIT is therefore considered an example of what is more generally referred to herein as a public key cryptography authentication system, although it is to be appreciated that embodiments of the invention are not limited to use with this particular type of system. As noted above, embodiments of the invention adapt such a system to support distributed password-based authentication in a manner that would otherwise not be supported by the system.

The modified protocol extension PKINIT* allows the user to supply the KDC 105 with a message comprising a password P encrypted under a public key $PK_{dist}$ that corresponds to the private key stored in a distributed manner over the servers 106. The resulting ciphertext $Enc_{PK_{dist}}[P]$ is processed by a distributed password-based authentication protocol using the key shares 112 stored in the respective servers 106. PKINIT* thus achieves compatibility with any type of distributed password-based authentication protocol that makes use of public key encryption on user passwords.

It should be noted in this regard that the term "password" as used herein is intended to be broadly construed so as to encompass passcodes, passphrases and other arrangements of multiple characters or other information utilized in authentication. For example, one-time passcodes generated by a hardware or software authentication token are considered passwords as the latter term is broadly used herein.

Conventional aspects of Kerberos are described in IETF RFC 4120, C. Neuman et al., "The Kerberos Network Authentication Service (V5)," July 2005, which is incorporated by reference herein. It is to be appreciated, however, that embodiments of the invention can be implemented outside of the Kerberos context.

Although shown as being separate from the servers 106 in the present embodiment, the controller 108 in other embodiments may be implemented at least in part in one or more of the servers 106. It is also possible that at least a portion of the controller 108 may be implemented in another system element, such as the relying server 110. Thus, for example, the relying server 110 in other embodiments may implement at least a portion of the global verifier 116 of the controller 108, and may be considered part of the KDC 105.

The client 102, servers 106, controller 108 and server 110 may be implemented as respective processing devices. A given such processing device may comprise, for example, a computer or other type of processing device configured to communicate with other such devices over the network 104. Each such processing device generally comprises at least one processor and an associated memory, and implements one or more functional modules for controlling certain features of the system 100.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. Such a memory and other memories disclosed herein may be viewed as examples of what are more generally referred to as "computer program products" storing executable computer program code.

Various elements of the system 100, such as the local verifiers 114 of the respective servers 106 and the global verifier 116 of the controller 108, may be implemented at least in part in the form of software that is stored in a memory of a processing device and executed by a processor of that processing device.

As indicated previously, the system 100 in the present embodiment implements one or more processes for distributed password-based authentication using a modified Kerberos protocol extension. Examples of such an authentication process performed at least in part in conjunction with the client 102 authenticating to the KDC 105 will be described in greater detail below, but it should be understood that numerous other types of processes may be used in other embodiments.

It is also to be appreciated that the particular set of elements shown in FIG. 1 for providing distributed password-based authentication is presented by way of example, and in other embodiments additional or alternative elements may be used. Thus, another embodiment may include additional networks and additional sets of clients or servers.

As mentioned above, various elements of system 100 such as clients, servers, controllers or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices. Examples of such processing platforms that may form at least a portion of the system 100 will be described below in conjunction with FIGS. 3 and 4.

The operation of the system 100 will now be described in greater detail with reference to the flow diagram of FIG. 2, which illustrates a set of operations performed primarily by KDC 105 in authenticating a message received from client 102 in an illustrative embodiment. The message in this embodiment comprises a password encrypted using a private key that is distributed over the servers 106 as respective key shares 112.

The process as shown includes steps 200, 202 and 204, all of which are assumed to be performed by elements of the KDC 105. It is to be appreciated that in other embodiments one or more such steps may be implemented at least in part by other system elements.

In step 200, servers $S_0, S_1, \ldots S_N$ are configured to store respective shares of a private key having a corresponding public key. The private key is a secret value collectively held by the servers 106 of the KDC 105 and the corresponding public key is assumed to be accessible to the client 102. The key shares may be generated and distributed by the controller 108 or using other techniques.

In step 202, a message from client 102 is received by the KDC 105 in conjunction with an authentication process. The message comprises a user password encrypted using the public key corresponding to the private key that is stored in a distributed manner across the servers 106. As indicated previously, the message is formatted in a manner consistent with an authentication protocol that normally utilizes public key signatures as a mechanism for authentication but is modified to support password-based authentication.

In step 204, distributed password-based authentication is performed in the KDC 105 based at least in part on the encrypted password utilizing the shares of the private key stored in the respective servers 106. The client may be authenticated based on indications received from respective ones of the servers $S_0, S_1, \ldots S_N$ as to whether or not the received message or portions thereof are valid in view of their respective key shares 112. For example, the received message may be accepted as a valid input only if a specified threshold number of the servers each indicates that the received message or a portion thereof is valid in view of their respective key shares 112. The specified threshold number of the servers may be all of the servers $S_0, S_1, \ldots S_N$. Alternatively, the specified threshold number may be fewer than all but more than a single one of those servers.

Figure 2:
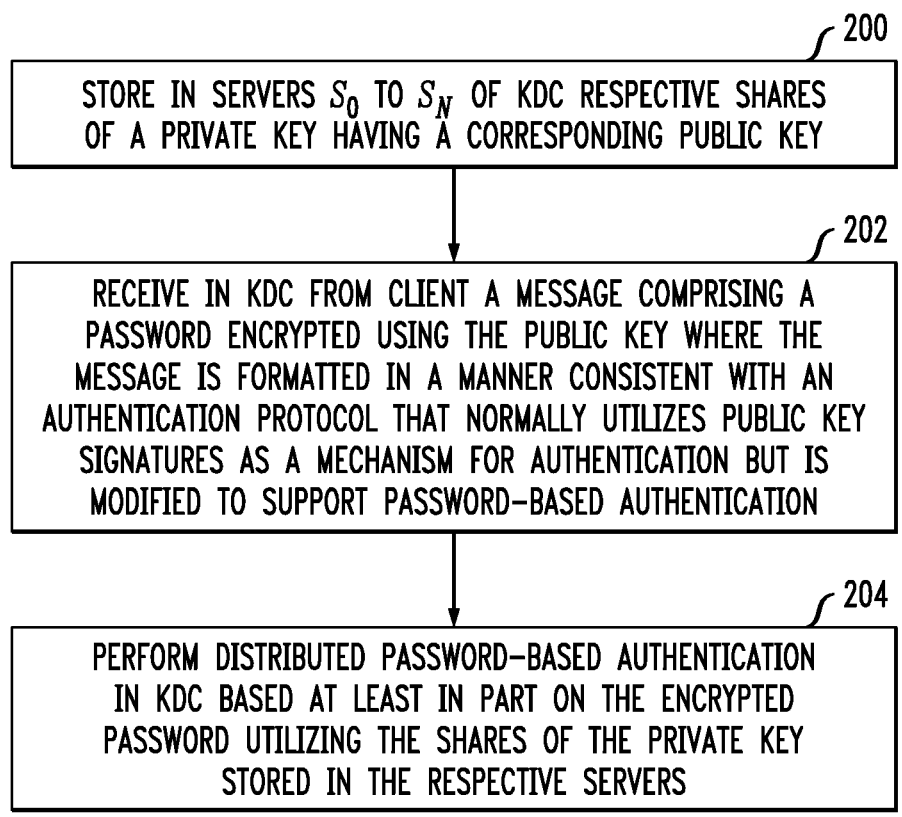
FIG. 2 is a flow diagram illustrating an exemplary distributed password-based authentication process performed in the FIG. 1 system.

The particular processing operations and other system functionality described in conjunction with the flow diagram of FIG. 2 are presented by way of illustrative example only, and should not be construed as limiting the scope of the invention in any way. Alternative embodiments can use other types of processing operations for distributed password-based authentication. For example, the ordering of the process steps may be varied in other embodiments, or certain steps may be performed concurrently with one another rather than serially.

Additional details regarding the operation of embodiments of the invention will now be provided with reference to exemplary arrangements in which it is assumed that the message is formatted in a manner consistent with a request message of a Kerberos PKINIT protocol extension. Those skilled in the art will recognize that the described embodiments can be extended in a straightforward manner to other embodiments that are based on alternative protocols.

It should also be appreciated that the particular features of the described PKINIT* embodiments are presented by way of example only, and other embodiments need not incorporate these features. It should be noted in this regard that the described PKINIT* embodiments require no significant modification of PKINIT protocol flows and minimal client modification.

Some PKINIT* embodiments may be viewed as utilizing multiple instances of public key encryption algorithms which may or may not be distinct. In the following description, Enc denotes any desired public key encryption algorithm supported in the underlying PKINIT protocol, and Enc2 denotes a public key encryption algorithm for key encapsulation in the PKINIT* protocol. Although it is possible to let Enc2=Enc, these two algorithms are separately identified in the description below to provide additional design flexibility in the PKINIT* protocol. A third public key encryption algorithm Enc3 is used to encrypt the password P. Its selection depends upon the distributed password-based authentication protocol to be used with the PKINIT* protocol.

Let enc denote a symmetric-key encryption algorithm in Kerberos. PKINIT* makes use of an authenticated symmetric-key encryption algorithm, which is denoted herein as enc*. $\Sigma_{SK}[m]$ denotes a digital signature, under private key SK, of message m.

Unmodified PKINIT data flows in public key encryption mode include the following request and response messages:

$$AS_{REQ} = (a,b,c) = Cert_C, \Sigma_{SK_C}[t_C, n_2], \{C, T, n_1\}$$

$$AS_{REP} = Enc_{PK_C}[Cert_K, \Sigma_{SK_K}[\kappa, n_2]], \{C, TGT, enc_\kappa[AK, n_1, T]\}$$

in which $t_c$ is a client-generated timestamp, $n_1$ and $n_2$ are random nonces also generated by the client, TGT is an encrypted "ticket-granting ticket" used in subsequent authentication to obtain resource-specific credentials, C is a client identifier, T is an identifier of the KDC, and AK is a secret key. Elements shown in curved brackets above are included for completeness, but are substantially the same in both the PKINIT and PKINIT* protocols.

The corresponding message flows in PKINIT* are denoted as $AS_{REQ}*$ and $AS_{REP}*$.

In the present embodiment, a client in PKINIT* authenticates to the KDC 105 using a password P included as a ciphertext in $AS_{REQ}*$. This password is bound to other message elements through inclusion in a common authenticated ciphertext. The key for this ciphertext is encapsulated under a public key of the KDC. The client also includes an ephemeral public key $PK_C$ for use in $AS_{REP}*$. This ephemeral public key may be viewed as a substitute for the persistent key of the client in PKINIT. The message $AS_{REP}*$ in PKINIT* is substantially the same as the message $AS_{REP}$ in PKINIT.

PKINIT* in the present embodiment requires the client to possess the KDC certificate $Cert_K$, or at least $PK_K$, at the beginning of the protocol. Thus $Cert_K$ may be distributed to clients upon system setup. The corresponding private key $SK_K$ is available to all servers 106 in the KDC 105 and used to decrypt and verify client messages. Clients must also possess a second public key $PK_{dist}$ for use in encrypting the user password P. The corresponding private key is not held by any particular one of the servers 106 but is instead distributed among those servers as respective key shares 112 in the manner previously described.

For compatibility with PKINIT data structures, the public keys $PK_K$ and $PK_{dist}$ may be treated as elements of a private signing key of a given client, as clients do not use digital signing keys in the PKINIT* protocol.

On initiating a PKINIT* authentication, a client generates an ephemeral key pair $(SK_C, PK_C)$ and generates the certificate $Cert_C*$ in a self-signed or unsigned form.

The PKINIT* request message $AS_{REQ}*$ is designed to serve at least two security goals that are distinct from those of the PKINIT request message $AS_{REQ}$. First, it includes a ciphertext $Enc_{PK_{dist}}[P]$ on password P under the public key $PK_{dist}$ for distributed verification by the KDC 105. Second, it authenticates the ephemeral key $PK_C$ implicitly by means of P rather than by means of a true client certificate $Cert_C$.

In the present embodiment, only the second message element in $AS_{REQ}*$ differs from those in $AS_{REQ}$. That is, $AS_{REQ}* = (a, b*, c)$, where b* is as follows:

$$b* = (r,s) = (Enc2_{PK_{K[\lambda],enc\lambda}}*[z = Enc3_{PK_{DIST}}[P], Cert_C*, t_C, n_2]).$$

As indicated above, in $AS_{REQ}$, message element $b = \Sigma_{SK_C}[t_c, n_2]$. To achieve compatibility with the PKINIT message structure, message element b* may be formulated using a new digital signature algorithm $\Sigma*$ under $SK_C$:

$$\Sigma_{SK_C}*[t_c, n_2] = (Enc2_{PK_{K[\lambda],enc\lambda}}*[z = Enc3_{PK_{dist}}[P], Cert_C*, t_c, n_2]),$$

where $\lambda$ is a randomly-generated symmetric key and password P may be viewed as a component of $SK_C$ or implicit input.

Given this exemplary signature definition, the message element b* may be illustratively represented as:

$$b* = \Sigma_{SK_C}*[t_c, n_2].$$

To verify the validity of $AS_{REQ}*$, the KDC computes:

$$\lambda \leftarrow Dec_{SK_K}[r] \text{ and}$$

$$z = Enc3_{PK_{dist}}[P], Cert_C*, t_c, n_2 \leftarrow dec_\lambda*[s].$$

The KDC then verifies that both decryptions are successful and yield correctly formatted outputs, and further that $t_c$ is fresh according to the same freshness criterion used in the PKINIT protocol. These and other operations referred to herein as being performed by the KDC may be performed at least in part in the controller 108 of the KDC, or in another designated KDC module.

If the verification is successful, the KDC provides $Enc3_{PK_{dist}}[P]$ to the servers 106 for distributed verification as previously described.

As noted above, $AS_{REP}*$ may be computed and verified exactly like $AS_{REP}$, i.e., it may be identical in PKINIT* and PKINIT.

If the KDC 105 is corrupted, it can impersonate a user by replaying an old, submitted password. Replay attacks of this type can be prevented by distributing $SK_K$ among the servers 106 such that decryption is performed jointly by these servers. This approach ensures distributed verification of the binding between password P and other message elements such as $Cert_C*$, $t_c$, etc. Servers can then sign individual assertions of valid authentication by the user for consumption by the TGS.

If the TGS 120 is corrupted, then credentials can be issued to users without submission of a correct password at all. This issue can be addressed by distributing ticket-granting functionality in a manner similar to the distributed verification of passwords as previously described. Accordingly, in some embodiments of the invention, at least a portion of the functionality of the TGS 120 may also be distributed over the servers 106, or over another set of servers.

Again, the particular PKINIT* protocol described above is exemplary only, and other embodiments may utilize different types of messaging, different numbers of servers, different types of key shares, different encryption and password arrangements, and so on. The foregoing embodiments should be considered as illustrative only, and numerous other embodiments can be configured using the techniques disclosed herein, in a wide variety of different cryptography applications.

It should also be understood that distributed password-based authentication functionality such as that described in conjunction with FIGS. 1 and 2 can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, these embodiments can advantageously eliminate situations in which a KDC represents a potential single point of compromise for user passwords or other authentication information.

Distributed password-based authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

Embodiments of the invention can utilize a variety of different types of distributed authentication implemented using two or more servers. For example, a commercial two-server system called Distributed Credential Protection (DCP) has recently been made available by RSA, The Security Division of EMC Corporation of Hopkinton, Mass., and can be adapted for use in embodiments of the invention. A wide variety of other threshold-based distributed authentication techniques may be used.

As indicated previously, the communication system 100 may be implemented using one or more processing platforms. One or more of the processing modules or other components of system 100 may therefore each run on a computer, storage device or other processing platform element. A given such element may be viewed as an example of what is more generally referred to herein as a "processing device."

Figure 3:
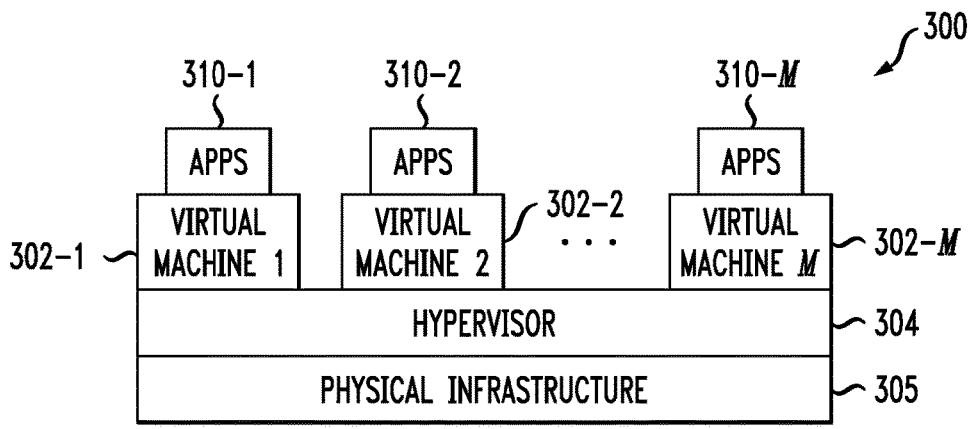
FIGS. 3 and 4 show examples of processing platforms that may be utilized to implement at least a portion of the communication system of FIG. 1.

Referring now to FIG. 3, one possible processing platform that may be used to implement at least a portion of one or more embodiments of the invention comprises cloud infrastructure 300. The cloud infrastructure 300 in this exemplary processing platform comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

The cloud infrastructure 300 may encompass the entire system 100 or only portions of that system, such as one or more of client 102, servers 106, controller 108 or relying server 110 in the system 100.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of system 100.

Figure 4:
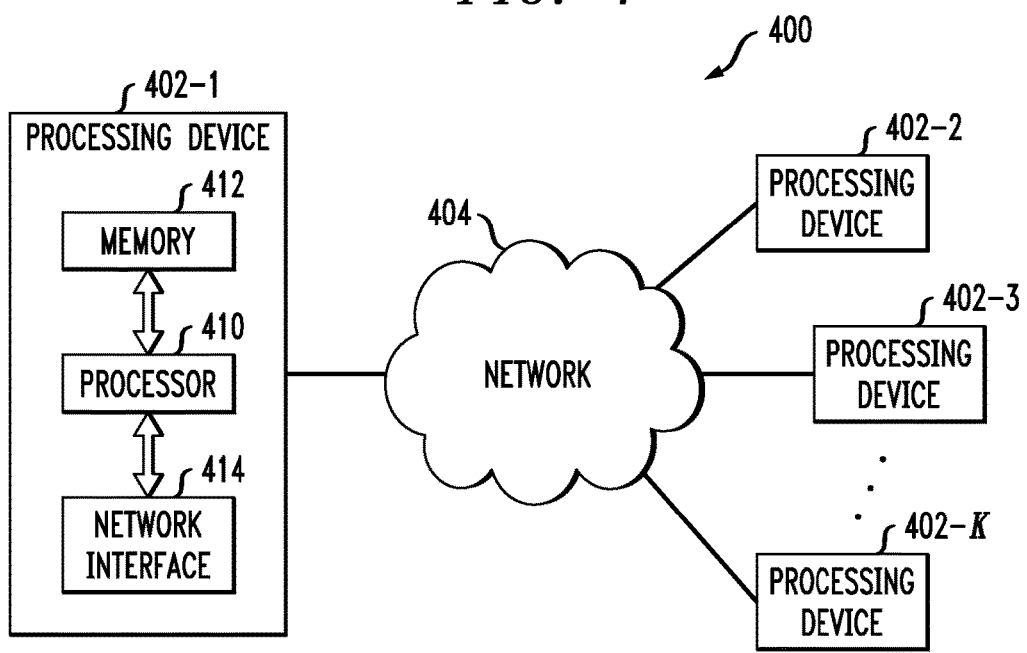

Another example of a processing platform is processing platform 400 shown in FIG. 4. The processing platform 400 in this embodiment comprises at least a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, a cellular network, a wireless network such as WiFi or WiMAX, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

The particular processing platform 400 shown in the figure is presented by way of example only, and system 100 may include additional or alternative processing platforms, as well as numerous distinct processing platforms in any combination, with each such platform comprising one or more computers, storage devices or other processing devices.

Multiple elements of system 100 may be collectively implemented on a common processing platform of the type shown in FIG. 3 or 4, or each such element may be implemented on a separate processing platform.

It should again be emphasized that the above-described embodiments of the invention are presented for purposes of illustration only. Many variations and other alternative embodiments may be used. For example, the techniques are applicable to a wide variety of other types of systems and devices that can benefit from distributed password-based authentication using modified protocols as disclosed herein. Also, the particular configuration of communication system and processing device elements shown in FIGS. 1-4, and the associated authentication techniques and message formats, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   storing in a plurality of servers of an authentication system respective shares of a private key;
   receiving in the authentication system a message comprising a password encrypted using a public key corresponding to the private key; and
   performing distributed password-based authentication in the authentication system based at least in part on the encrypted password utilizing the shares of the private key stored in the respective servers;
   wherein the message comprises a request message formatted in accordance with a Kerberos PKINIT protocol extension that has been modified to support password-based authentication by configuring the request message to include a message element that incorporates the encrypted password;
   wherein an unmodified version of the Kerberos PKINIT protocol extension is configured to utilize public key signatures as a mechanism for authentication;
   wherein the request message comprises an (a, b, c)-formatted authentication service request message of the Kerberos PKINIT protocol extension that has been modified to incorporate the encrypted password;
   wherein the modified (a, b, c)-formatted authentication service request message of the Kerberos PKINIT protocol extension comprises a modified authentication service request message $AS_{REQ}^* = (a, b^*, c)$, where message elements a and c are the same as in an unmodified authentication service request message $AS_{REQ}$ and message element $b^*$ incorporates the encrypted password; and
   wherein the method is implemented by at least one processing device comprising a processor coupled to memory.

2. The method of claim 1 wherein performing distributed password-based authentication in the authentication system comprises:
   performing local verifications in respective ones of the servers; and
   generating a global verification of the received request message based on results of the local verifications.

3. The method of claim 1 wherein the encrypted password is bound to other message elements through inclusion with those other message elements in a common ciphertext.

4. The method of claim 3 wherein the request message further comprises an additional key used to generate the common ciphertext with said additional key being encrypted using a public key of a key distribution center.

5. The method of claim 1 wherein the servers comprise distributed authentication servers of a key distribution center.

6. The method of claim 1 wherein the (a, b, c)-formatted authentication service request message of the Kerberos PKINIT protocol extension absent the modification to incorporate the encrypted password comprises the unmodified authentication service request message $AS_{REQ}$ of the form:

$$AS_{REQ} = (a,b,c) = Cert_C, \Sigma_{SK_C}[t_C,n_2], \{C,T,n_1\},$$

where $t_c$ is a timestamp, $n_1$ and $n_2$ are random nonces, C is a client identifier, $Cert_C$ is a client certificate, $\Sigma_{SK_C}$ is a digital signature generated using a client secret key $SK_C$, and T is an identifier of the key distribution center.

7. The method of claim 1 wherein the modified (a, b, c)-formatted authentication service request message of the Kerberos PKINIT protocol extension comprises the modified authentication service request message $AS_{REQ}^* = (a, b^*,$ c), where message elements a and c are the same as in the unmodified authentication service request message $AS_{REQ}$ and message element $b^*$ is given by:

$$b^* = (r,s) = (Enc2_{PK_K[\lambda],enc\lambda}^*[Z = Enc3_{PK_{DIST}}[P], Cert_C^*, t_C, n_2]),$$

where P denotes the password, $PK_K$ denotes a public key of the key distribution center, $PK_{dist}$ denotes the public key corresponding to the private key stored as shares on the servers, $Enc_{PK_K}[\lambda]$ denotes encryption of a symmetric key $\lambda$ under the public key $PK_K$, $Enc_{PK_{dist}}[P]$ denotes encryption of the password P under the public key $PK_{dist}$, $enc_\lambda^*$ denotes an authenticated symmetric-key encryption algorithm using symmetric key $\lambda$, and $Cert_C^*$ denotes a certificate generated using a client ephemeral key pair $(SK_C, PK_C)$.

8. The method of claim 7 wherein performing distributed password-based authentication in the authentication system comprises:
   computing $\lambda \leftarrow Dec_{SK_K}[r]$;
   computing $z = Enc_{PK_{dist}}[P], Cert_C^*, t_c, n_2 \leftarrow dec_\lambda^*[s]$;
   verifying $AS_{REQ}^*$ as correct based on results of the computing and freshness of the timestamp $t_c$; and
   if $AS_{REQ}^*$ is verified as correct, providing the encrypted password $Enc_{PK_{dist}}[P]$ to the plurality of servers for joint verification.

9. The method of claim 1 wherein the modified (a, b, c)-formatted authentication service request message of the Kerberos PKINIT protocol extension comprises the modified authentication service request message $AS_{REQ}^* = (a, b^*,$ c), where message elements a and c are the same as in the unmodified authentication service request message $AS_{REQ}$ and message element $b^*$ is given by:

$$b^* = \Sigma_{SK_C}^*[t_c, n_2]$$

where $\Sigma_{SK_C}^*$ denotes a modified digital signature generated using a client secret key $SK_C$ over a plurality of message elements including the encrypted password, and where $t_c$ is a timestamp and $n_2$ is a random nonce.

10. The method of claim 1 wherein each of the servers stores a secret key $SK_K$ of a key distribution center.

11. The method of claim 1 wherein the public key comprises one of a plurality of signing keys of a given client.

12. The method of claim 1 wherein the request message is received in a key distribution center of the authentication system from a client device.

13. A method comprising:
   storing in a plurality of servers of an authentication system respective shares of a private key;
   receiving in the authentication system a message comprising a password encrypted using a public key corresponding to the private key; and
   performing distributed password-based authentication in the authentication system based at least in part on the encrypted password utilizing the shares of the private key stored in the respective servers;
   wherein the message comprises a request message formatted in accordance with a Kerberos PKINIT protocol extension that has been modified to support password-based authentication by configuring the request message to include a message element that incorporates the encrypted password;
   wherein an unmodified version of the Kerberos PKINIT protocol extension is configured to utilize public key signatures as a mechanism for authentication;
   wherein the request message includes a ciphertext $Enc_{PK_{dist}}[P]$ on password P under a public key $PK_{dist}$ for distributed verification using key shares of a corresponding private key $SK_{dist}$ stored on respective ones of the plurality of servers; and wherein the method is implemented by at least one processing device comprising a processor coupled to memory.

14. A computer program product comprising a non-transitory processor-readable storage medium having embodied therein one or more software programs, wherein the one or more software programs when executed by at least one processing device cause said at least one processing device:

to store in a plurality of servers of an authentication system respective shares of a private key;

to receive in the authentication system a message comprising a password encrypted using a public key corresponding to the private key; and to perform distributed password-based authentication in the authentication system based at least in part on the encrypted password utilizing the shares of the private key stored in the respective servers;

wherein the message comprises a request message formatted in accordance with a Kerberos PKINIT protocol extension that has been modified to support password-based authentication by configuring the request message to include a message element that incorporates the encrypted password;

wherein an unmodified version of the Kerberos PKINIT protocol extension is configured to utilize public key signatures as a mechanism for authentication;

wherein the request message comprises an (a, b, c)-formatted authentication service request message of the Kerberos PKINIT protocol extension that has been modified to incorporate the encrypted password; and wherein the modified (a, b, c)-formatted authentication service request message of the Kerberos PKINIT protocol extension comprises a modified authentication service request message $AS_{REQ}^{*}=(a, b^{*}, c)$, where message elements a and c are the same as in an unmodified authentication service request message $AS_{REQ}$ and message element $b^{*}$ incorporates the encrypted password.

15. The computer program product of claim 14 wherein performing distributed password-based authentication in the authentication system comprises:

performing local verifications in respective ones of the servers; and generating a global verification of the received request message based on results of the local verifications.

16. The computer program product of claim 14 wherein the encrypted password is bound to other message elements through inclusion with those other message elements in a common ciphertext.

17. The computer program product of claim 16 wherein the request message further comprises an additional key used to generate the common ciphertext with said additional key being encrypted using a public key of a key distribution center.

18. An apparatus comprising:

a server comprising a local verifier;

wherein the server is configured for use as one of a plurality of servers of an authentication system storing respective shares of a private key;

the server being configured to store its corresponding share of the private key;

the local verifier being configured to generate an indication based on the stored share and at least a portion of a received message comprising a password encrypted using a public key corresponding to the private key;

wherein the indication is utilizable in conjunction with corresponding indications generated by respective ones of the other servers to implement distributed password-based authentication based at least in part on the encrypted password utilizing the shares of the private key stored in the respective servers;

wherein the message comprises a request message formatted in accordance with a Kerberos PKINIT protocol extension that has been modified to support password-based authentication by configuring the request message to include a message element that incorporates the encrypted password;

wherein an unmodified version of the Kerberos PKINIT protocol extension is configured to utilize public key signatures as a mechanism for authentication;

wherein the request message comprises an (a, b, c)-formatted authentication service request message of the Kerberos PKINIT protocol extension that has been modified to incorporate the encrypted password;

wherein the modified (a, b, c)-formatted authentication service request message of the Kerberos PKINIT protocol extension comprises a modified authentication service request message $AS_{REQ}^{*}=(a, b^{*}, c)$, where message elements a and c are the same as in an unmodified authentication service request message $AS_{REQ}$ and message element $b^{*}$ incorporates the encrypted password; and wherein the server is implemented by at least one processing device comprising a processor coupled to memory.

19. An apparatus comprising:

a controller comprising a global verifier;

the global verifier being configured to interface with a plurality of servers of an authentication system storing respective shares of a private key;

the global verifier being configured to authenticate a received message based on indications from respective ones of the plurality of servers generated in accordance with distributed password-based authentication, the received message comprising a password encrypted using a public key corresponding to the private key;

wherein the message comprises a request message formatted in accordance with a Kerberos PKINIT protocol extension that has been modified to support password-based authentication by configuring the request message to include a message element that incorporates the encrypted password;

wherein an unmodified version of the Kerberos PKINIT protocol extension is configured to utilize public key signatures as a mechanism for authentication;

wherein the request message comprises an (a, b, c)-formatted authentication service request message of the Kerberos PKINIT protocol extension that has been modified to incorporate the encrypted password;

wherein the modified (a, b, c)-formatted authentication service request message of the Kerberos PKINIT protocol extension comprises a modified authentication service request message $AS_{REQ}^{*}=(a, b^{*}, c)$, where message elements a and c are the same as in an unmodified authentication service request message $AS_{REQ}$ and message element $b^{*}$ incorporates the encrypted password; and wherein the controller is implemented by at least one processing device comprising a processor coupled to memory.

20. An authentication system comprising:
a plurality of servers storing respective shares of a private key; and
a controller associated with the servers;
wherein the authentication system is configured to receive a message comprising a password encrypted using a public key corresponding to the private key;
wherein the controller directs performance of distributed password-based authentication in the authentication system based at least in part on the encrypted password utilizing the shares of the private key stored in the respective servers;
wherein the message comprises a request message formatted in accordance with a modified Kerberos PKINIT protocol extension that supports password-based authentication by configuring the request message to include a message element that incorporates the encrypted password;
wherein an unmodified version of the modified Kerberos PKINIT protocol extension is configured to utilize public key signatures as a mechanism for authentication;
wherein the request message comprises an (a, b, c)-formatted authentication service request message of the Kerberos PKINIT protocol extension that has been modified to incorporate the encrypted password;
wherein the modified (a, b, c)-formatted authentication service request message of the Kerberos PKINIT protocol extension comprises a modified authentication service request message $AS_{REQ}^{*}=(a, b^{*}, c)$, where message elements a and c are the same as in an unmodified authentication service request message $AS_{REQ}$ and message element $b^{*}$ incorporates the encrypted password; and
wherein the plurality of servers and the controller are implemented by at least one processing device comprising a processor coupled to memory.

21. A communication system comprising the authentication system of claim 20 and one or more client devices, a given one of the client devices being adapted to provide the request message to the authentication system over a network in conjunction with an authentication attempt.

* * * * *